United States Patent [19]

Kassai

[11] 4,171,132
[45] Oct. 16, 1979

[54] INFANT WALKING TRAINER

[75] Inventor: Kenzou Kassai, Higashishimizu, Japan

[73] Assignee: Kassai Kabushiki Kaisha, Osaka, Japan

[21] Appl. No.: 862,056

[22] Filed: Dec. 19, 1977

[30] Foreign Application Priority Data

Jan. 14, 1977 [JP] Japan ............................. 52/3593[U]

[51] Int. Cl.² ........................................... A47D 13/04
[52] U.S. Cl. .............................. 272/70.3; 248/188.6; 280/87.05; 297/5; 403/100
[58] Field of Search .............. 272/70.3, 70; D12/130; 280/87.02 R, 87.02 W, 87.05, 7.1, 7.11, 43, 647, 648, 649, 650; 15/185; 297/5, 6; 248/188.6, 188.8, 166; 403/100; 292/263, 152

[56] References Cited

U.S. PATENT DOCUMENTS

| | | | |
|---|---|---|---|
| 16,862 | 3/1857 | Thomas | 272/70.3 |
| 1,204,249 | 11/1916 | Condon, Jr. | 272/70.3 |
| 1,806,454 | 5/1931 | Goudeau | 248/188.6 X |
| 1,906,218 | 4/1933 | Patchell | 403/100 |
| 2,306,780 | 12/1942 | Copson | 272/70.3 |
| 2,467,579 | 4/1949 | Boudreau | 403/100 |
| 2,490,988 | 12/1949 | Wheeler | 280/650 |
| 3,205,521 | 9/1965 | McCaughey et al. | 403/100 X |
| 3,504,927 | 4/1970 | Seki | 280/87.05 |
| 3,796,430 | 3/1974 | Sudo | 272/70.3 |
| 4,065,086 | 12/1977 | Nakao | 272/70.3 X |

FOREIGN PATENT DOCUMENTS 459905 10/1950 Italy ............................. 272/70.3
48-88250 12/1973 Japan ............................. 272/70.3

Primary Examiner—Richard C. Pinkham
Assistant Examiner—Arnold W. Kramer
Attorney, Agent, or Firm—Browdy and Neimark

[57] ABSTRACT

An infant walking trainer can be folded by easy operation. The infant walking trainer includes a lower circular frame provided with a plurality of wheels, an upper circular frame confronting the lower circular frame, a lower supporting rod pivotally and rotatably projecting from the lower circular frame, and an upper supporting rod pivotally and rotatably depending from the upper circular frame. A connecting means connects the upper end of the lower supporting rod and the lower end of the upper supporting rod rotatably with each other. Lower and upper engaging grooves and lower and upper engaging portions are provided on the upper end of the lower supporting rod and on the lower end of the upper supporting rod respectively. An engaging member fixes the lower and upper supporting rods collinearly by being engaged with the lower and upper engaging portions, the engaging means being slidable with the lower and upper engaging grooves. A resilient engaged state maintaining member maintains the engaged state of the engaging member.

3 Claims, 5 Drawing Figures

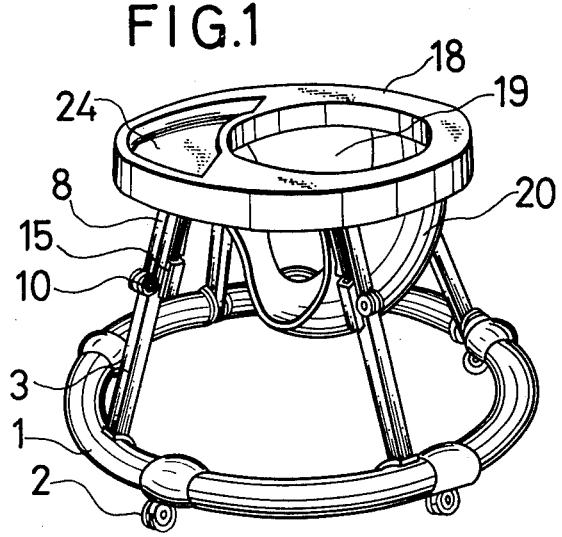
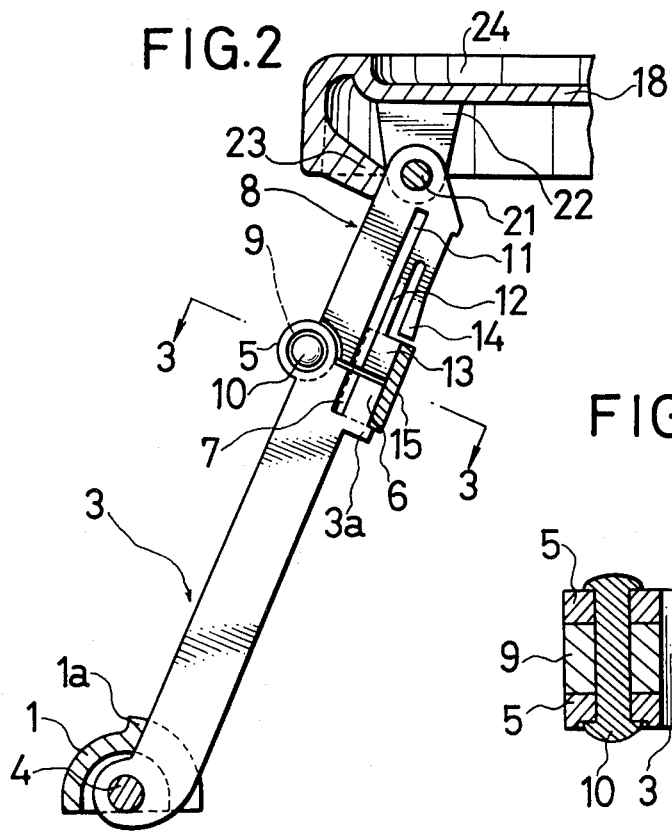

INFANT WALKING TRAINER

BACKGROUND OF THE INVENTION

The present invention relates to an infant walking trainer.

Generally, infant walking trainers are very convenient for an infant to take exercise by walking by himself. That is, an infant enters into a circular frame which has an aperture large enough for his body and takes walking exercise, supporting his body by his hands placed on the circular frame. Then, the infant walking trainer moves according to his walk by the wheels provided at the lower circular frame. Accordingly, the infant never tumbles down in taking walking exercise, nor falls down from a step as in taking exercise without the walking trainer because the place for exercise is restricted to plane surfaces. So, walking trainers are quite safe for infants to take walking exercise. Furthermore, it is not only possible for an infant to take a rest sitting on the seat when he is tired, but also it is possible to use walking trainers simply as chairs for infants. Walking trainers have a variety of merits as described above.

Furthermore, it is desirable that walking trainers be foldable so that they may not occupy a large space when they are put away. As a conventional foldable infant walking trainer, there is one which is shown on the Official Gazette of Japanese Utility Model Laid Open to Public Inspection No. Sho. 50-88250.

SUMMARY OF THE INVENTION

An object of the present invention is to provide a foldable infant walking trainer, the construction of which is different from that of the prior art.

Another object of the present invention is to provide an infant walking trainer which is simple in structure and can be easily folded.

Yet another object of the present invention is to provide an infant walking trainer which is quite stable in the state for use, an upper circular frame not moving left or rightwards relative to a lower circular frame.

The above and further objects, features, and advantages of the present invention will appear more fully from the following description.

BRIEF DESCRIPTION OF THE DRAWINGS

FIG. 1 shows a perspective view of one embodiment of an infant walking trainer of the present invention in the state for use.

FIG. 2 shows a partially enlarged partially cross sectional side view thereof in the state for use.

FIG. 3 shows a cross-sectional view along line 3—3 of FIG. 2.

DETAILED DESCRIPTION OF THE PREFFERRED EMBODIMENT

Figure 4:
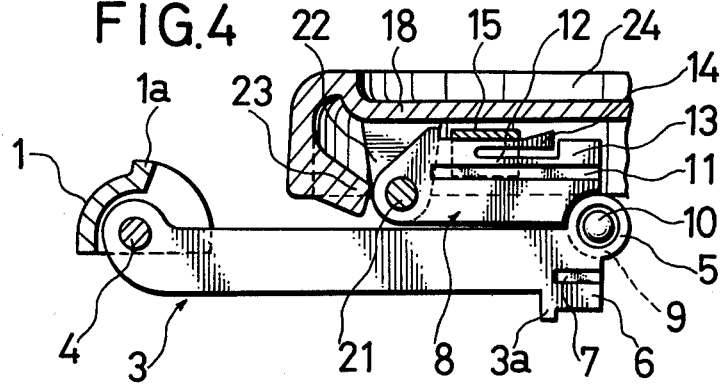
FIG. 4 shows a partially enlarged partially cross sectional side view thereof in a folded state.
Figure 5:
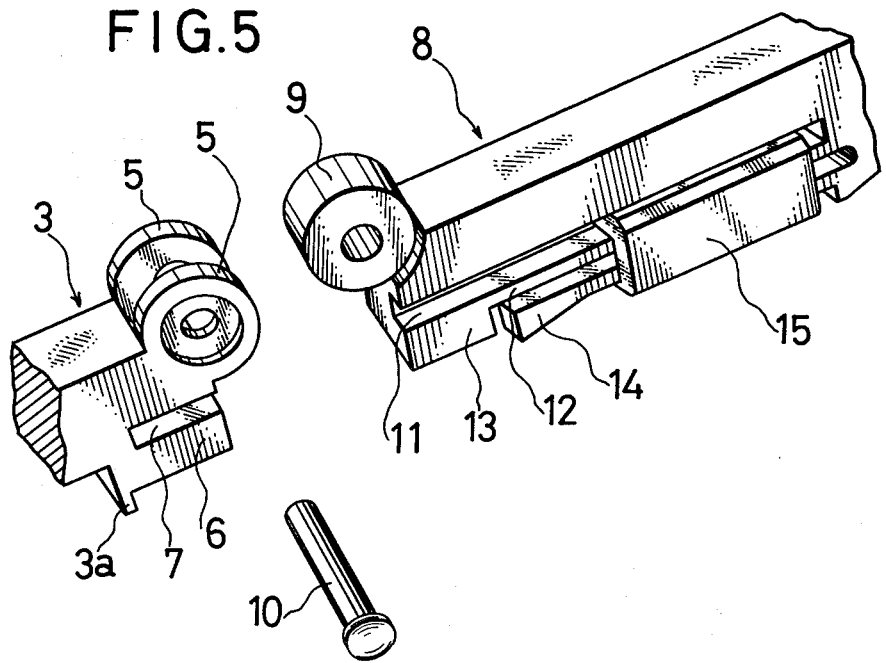
FIG. 5 shows a perspective view of a disassembled main part thereof.

In the exemplary embodiment of the present invention shown in FIG. 1 to FIG. 5 inclusive, the infant walking trainer has a lower circular frame 1 and an upper circular frame 18 confronting the lower circular frame 1. The lower circular frame 1 is provided with a plurality of wheels 2 at desired positions. The upper circular frame 18 is provided with an aperture through which the body of an infant may be inserted. Furthermore, a seat 20 is hung down between the front inside and the rear inside of the upper circular frame 18, and a hollow 24 for foods or toys is provided on the front upper surface of the upper circular frame.

A lower supporting rod 3 is provided pivotally and rotatably projecting from the axis 4 of the lower circular frame 1, and an upper supporting rod 8 is provided pivotally and rotatably depending from a projection 22 provided at the inside of the circular frame 18. A pair of circular portions 5,5 are provided at both sides of the left portion (as viewed in FIG. 2) of the upper end of the lower supporting rod 3 in FIG. 2, and a circular portion 9 is provided at the left portion of the lower end of the upper supporting rod 8. The circular portion 9 is inserted between both circular portions 5,5 and the former is rotatably connected to the latter by a pin 10 as a connecting means.

Lower supporting rod 3 is prevented from rotating leftwards in FIG. 2 by being in contact with a first stopper 1a provided on the lower circular frame 1, and the upper supporting rod 8 is prevented from rotating leftwards in FIG. 2 by being in contact with a second stopper 23 provided at the internal surface of the upper circular frame 18. A pair of lower engaging grooves 7,7, rectangular in section, are provided at both sides of the upper portion of the lower supporting rod 3 along the lengthwise direction thereof, and a pair of upper elongated engaging grooves 11,11 rectangular in cross section are provided at both sides of the upper supporting rod 8 along the lengthwise direction thereof continuously with the lower engaging grooves 7,7. Lower and upper rectangular engaging portions 6,13 are provided inside of the lower engaging ditches 7,7 at the upper end of the lower supporting rod 3 and the upper engaging grooves 11,11 at the lower end of the upper supporting rod 8, respectively. An engaging means 15 of C-shaped cross section is provided to be engageable with the lower and upper engaging portions 6,13. Both confronting tops 17,17 of the C-shaped engaging means 15 are engageable with the lower engaging grooves 7,7 and the upper elongated engaging grooves 11,11, and the engaging means 15 is slidable along the elongated engaging grooves 11,11. A stopping projection 3a is provided just below the lower engaging portion 6 of the lower supporting rod 3 to be in contact with engaging means 15. On the other hand, an engaged-state maintaining means 14 is provided depending from the upper portion of a side portion 12 of the upper supporting rod 8 to form an inverse U-shaped side view with the side portion 12. The side portion 12 is provided with the upper engaging portion 13 at the lower end. Maintaining means 14 is movable in the transverse direction of the upper supporting rod 8. Maintaining means 14 prevents the engaging means 15 from moving upwards in its usual state, and maintaining means 14 is inserted into the cavity 16 of the C-shaped engaging means 15 when the engaging means 15 is moved upwards after pushing the maintaining means 14 towards the upper supporting rod 8.

The folding operation of the infant walking trainer is described as the following:

In the state for use as shown in FIG. 1, the lower supporting rod 3 and the upper supporting rod 8 are connected collinearly as shown in FIG. 2, the engaging means 15 is engaged with both the lower engaging portion 6 of the lower supporting rod 3 and the upper engaging portion 13 of the upper supporting rod 8, and the engaging means 15 is in contact with the stopping projection 3a of the lower supporting rod 3. So, the lower and upper supporting rods 3 and 8 cannot be folded inwardly with each other, and the infant walking trainer is fixedly maintained in the state for use. Furthermore, in this state for use, the upper circular frame 18 is prevented from moving left and rightwards relative to the lower circular frame 1 because the lower and upper supporting rods 3,8 are in contact with the first and second stoppers 1a,23 respectively. Thus, the state for use of the walking trainer is quite stable.

When the walking trainer is folded from this state for use, the engaging means 15 is moved upwards along the lower and upper engaging grooves 7,11 after pushing the maintaining means 14 towards the upper supporting rod 8 in order to make the height of the maintaining means 14 lower than that of the upper engaging portion 13. Then, the engaging means 15 is released from engagement with the lower engaging portion 6, and the maintaining means 14 is inserted into the rectangular cavity 16 of the engaging means 15. When the engaging means 15 is moved upwards further, the engaging means 15 is released from engagement with the upper engaging portion 13. When the lower supporting rod 3 is folded inwards after sliding the engaging means 15 upwards fully, the upper supporting rod 8 also folds inwards and both supporting rods 3,8 are finally folded as shown in FIG. 4. Thus, the walking trainer is folded into a small and flat configuration.

When the walking trainer is opened to the state for use from this folded state, the upper circular frame 18 is pulled up. Then, the lower supporting rod 3 rotates left and upwards and upper supporting rod 8 rotates right and upwards respectively in FIG. 4. When the upper circular frame 18 is pulled fully upwards and the engaging means 15 is pushed down along the upper elongated engaging grooves 11,11, the engaging means 15 becomes engaged with the upper and lower engaging means 13,6. When the engaging means 15 is pushed fully down so as to be in contact with the stopping projection 3a, the maintaining means 14 appears outside from the rectangular cavity 16 of the engaging means and it is restored to the original state by its elasticity. So, the maintaining means 14 prevents the engaging means 15 from moving upwards by the lower end thereof contacting with the upper end of the engaging means 15 even if the engaging means 15 should move upwards. Accordingly, the engaging means 15 would never be released from the engagement with the lower and upper engaging portions 6,13. As a result, the walking trainer is maintained stably in the state for use.

The features and effects of this embodiment of the present invention are described as the following.

(A) The infant walking trainer is strongly built because it is possible to use rigid material for the lower and upper supporting rods.

(B) Accordingly, the upper circular frame does not move even if a force should be exerted to move the upper circular frame left and rightwards, and the life of the trainer is long.

(C) The state for use of the walking trainer is solid and stable because an engaging means is provided engageable with the lower and upper engaging portions for supporting the lower and upper supporting rods collinearly.

(D) The engaging means never moves upwardly unexpectedly because it contacts with the engaged state maintaining means even if a force should be exerted to move the engaging means upwards. So, the walking trainer is securely maintained in the state for use, and it is quite highly safe.

(E) The structure is quite simple because the main constitutive elements are only the lower and upper circular frames, the lower and upper supporting rods, and the engaging means.

(F) It can be folded quite easily by pushing down the upper circular frame after sliding the engaging means upwards so that the engaged state maintaining means may be inserted into the cavity of the engaging means because the engaging means is provided engageably with the lower and upper engaging portions of lower and upper supporting rods and slidably with the upper elongated engaging grooves.

(G) The upper circular frame does not move left and rightwards relative to the lower circular frame because the lower and upper supporting rods are maintained collinearly and the inclination angle does not change, both rods being in contact with the first and second stoppers respectively. So, the state for use of the walking trainer is quite stable.

Although the present invention has been described in its preferred form with a certain degree of particularity, it is understood that the present disclosure of the preferred form has been changed in the details of construction and the construction and arrangements of parts may be resorted to without departing from the spirit and the scope of the invention as hereinafter claimed.

What is claimed is:

1. An infant walking trainer, comprising:
    a lower circular frame provided with a plurality of wheels;
    an upper circular frame confronting said lower circular frame;
    a lower supporting rod pivotally and rotatably projecting from said lower circular frame;
    a first stopper provided on said lower circular frame and contacting the outer side of said lower supporting rod when in the engaged state, for limiting outward rotation of said lower supporting rod;
    an upper supporting rod pivotally and rotatably depending from said upper circular frame;
    a second stopper provided in the internal surface of said upper circular frame and contacting the outer side of said upper supporting rod when in the engaged state, for limiting outward rotation of said upper supporting rod;
    a connecting means connecting the upper end of said lower supporting rod and the lower end of said upper supporting rod rotatably with each other;
    at least one lower and one upper engaging groove and a lower and an upper engaging portion which are provided on the upper end of said lower supporting rod and on the lower end of said upper supporting rod, respectively;
    an engaging means for fixing said lower and upper supporting rods collinearly by engaging both said lower and upper engaging portions when in the engaged state, said engaging means being slidable with said lower and upper engaging grooves; and
    an engaged state maintaining means for maintaining the engaged state of said engaging means.

2. An infant walking trainer according to claim 1 wherein said lower and upper engaging grooves are provided on both sides of said lower and upper engaging portions are provided on the portion of said respective lower and upper supporting rods facing the interior of said circular frames when in the engaged state, said engaging means is C-shaped in cross section, and both confronting tops of said C-shaped engaging means are slidably engaged with said lower and upper engaging grooves.

3. An infant walking trainer according to claim 2, wherein a stopping projection is provided at the bottom of said lower engaging portion of said lower supporting rod to contact with said engaging means in the engaged state thereof, and said engaged state maintaining means depends from the upper portion of said upper supporting rod to prevent the upward movement of said engaging means, said maintaining means being insertable into the cavity of said C-shaped engaging means when said engaging means is moved upwardly after pushing said maintaining means toward said upper supporting rod.

* * * * *